Feb. 12, 1963

J. A. PIETSCH 3,077,080

THERMOELECTRIC AIR CONDITIONING APPARATUS

Filed Dec. 12, 1961

INVENTOR.
JOSEPH A. PIETSCH

BY [signature]

HIS ATTORNEY 3,077,080
THERMOELECTRIC AIR CONDITIONING APPARATUS

Joseph A. Pietsch, Louisville, Ky., assignor to General Electric Company, a corporation of New York Filed Dec. 12, 1961, Ser. No. 158,680
1 Claim. (Cl. 62—3)

Figure 1:
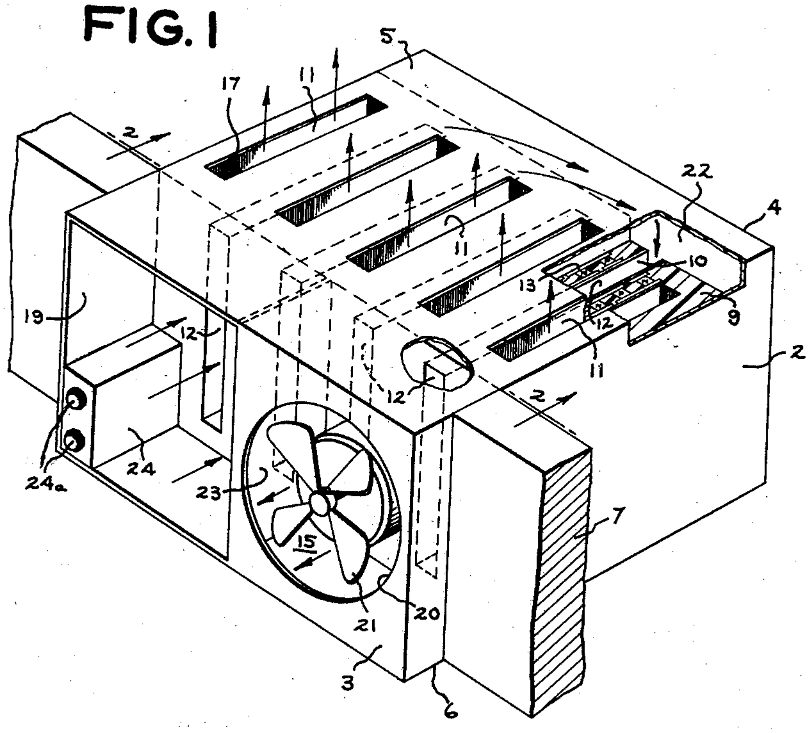

The present invention relates to air conditioning apparatus and is more particularly concerned with an improved arrangement for adapting thermoelectric heat exchange devices to a self-contained air conditioning unit.

When two materials which have dissimilar thermoelectric properties are joined and a direct current is passed through the junction, the junction becomes either hot or cold depending upon the direction of the current flowing therethrough. This characteristic of thermoelectric junctions may be usefully applied for heating and cooling purposes much in the manner as refrigeration systems have been used in the past. A thermoelectric air conditioning device, in its simplest form, comprises a series of junctions of dissimilar thermoelectric materials across which a source of D.C. power is connected to force a direct current flow. Alternate junctions of the thermocouples formed by the thermoelectric materials either absorb heat or generate heat and are, therefore, segregated so that all like junctions are exposed to the same ambient. The above-described arrangement of thermoelectric junctions is commonly called a thermopile and, for air conditioning purposes, one side of the thermopile is arranged in heat exchange relationship with air from an enclosure while the other side is arranged in heat exchange relationship with an external source of cooling or heating, such as outdoor air.

In the past there have been various arrangements proposed which utilize thermoelectric junctions or thermopiles for cooling and heating purposes. Many of these have been difficult to install and require laborious and costly assembly operations at the mounting site. It is desirable to provide a unitary thermoelectric heating and cooling structure that may be installed at the site as a unit and which may be easily adapted to various mounting conditions.

Accordingly, it is an object of the present invention to provide an improved thermoelectric air conditioning structure of the self-contained type which may be easily installed as an integral unit at the air conditioning site.

It is another object of the present invention to provide an improved thermoelectric air conditioning structure which may be mounted as an integral unit somewhat in the same manner as a window mounted air conditioner with a portion thereof extending into an enclosure and another portion extending outside the enclosure.

A more specific object of the invention is to provide an improved thermopile arrangement which is particularly well adapted to the air flow conditions usually encountered with window mounted or through the wall type air conditioner housings.

Further objects and advantages of the invention will become apparent as the following description proceeds and the features of novelty which characterize the invention will be pointed out with particularity in the claim annexed to and forming a part of this specification.

In carrying out the objects of the present invention, there is provided a case having its interior divided into first and second groups of substantially parallel cross-flow air flow passages by means of a plurality of thermopile units arranged in parallel relationship across the case. Each of the thermopile units has one side adapted to absorb heat from an air flow passage of one group and the opposite side adapted to dissipate heat into an air flow passage of the other group when an electrical current is passed through the thermopile units. Openings, communicating with outdoor air, are provided on opposite sides of the case through which out-door air flows through the first group of air flow passages in heat exchange relationship with the sides of the thermopile units adjacent thereto. Means are provided, including inlet and discharge openings in that portion of the case exposed to the enclosure air for circulating air from the enclosure through the case and the second group of air flow passages. Enclosure air enters certain of the air flow passages of the second group through the inlet opening of the case where it is heated or cooled by the sides of the thermopile units adjacent thereto. A plenum chamber in the end of the case remote from the enclosure communicates with all of the air flow passages of the second group and diverts the enclosure air flowing through certain of these passages into the remainder of the passages where it is further heated or cooled before passing out of the unit through the discharge opening which communicates with the remainder of the second group of air flow passages.

Figure 2:
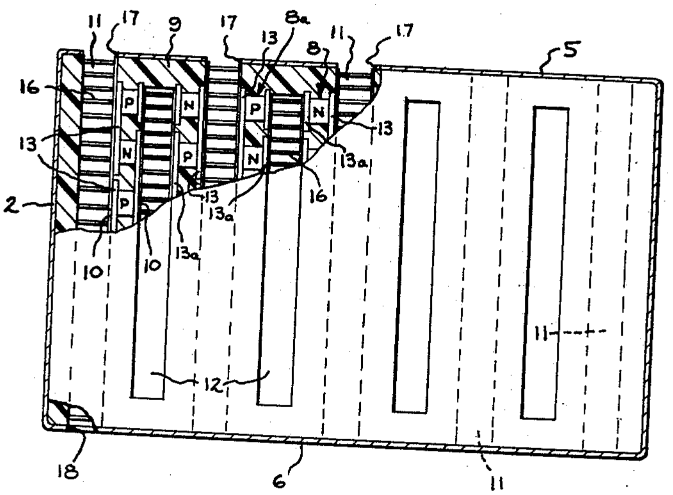

For a better understanding of the invention, reference may be had to the accompanying drawing in which:

FIGURE 1 is a perspective view illustrating the arrangement of the cross flow air flow passages of the self-contained thermoelectric unit; and FIGURE 2 is a cross-sectional view taken along line 2—2 of FIGURE 1 illustrating a cross-section of the thermopile members in heat exchange relationship with indoor and outdoor air flowing through the unit.

Referring now to FIGURE 1 there is shown a self-contained air conditioning unit of the type adapted for mounting in an outer wall of an enclosure with one end thereof exposed to air from the enclosure and with the opposite end thereof exposed to air from outside the enclosure. Obviously the unit does not need to be arranged within an outer wall of an enclosure but is necessarily arranged so that one end portion thereof is exposed to enclosure air and the opposite end portion is exposed to outdoor air. For example, air may be introduced to the indoor and outdoor portions of the case through means of duct work and plenum chambers such as are found in central air conditioning apparatus. However, the thermoelectric air conditioner of the present invention is particularly well adapted to be mounted in the same manner as the so-called window air conditioners which are arranged through an outer wall of an enclosure. For this reason the arrangement is illustrated and described in this type of installation.

The unit comprises a case 2 which, in the present embodiment of the invention, is a rectangular case having a front side 3 and a rear end 4 with a top 5 and bottom 6. Like the so-called window-mounted air conditioners, the case 2 is adapted to be mounted within a window or through an outer wall of an enclosure such as the wall 7 shown in FIGURE 1. The front portion and side 3 are exposed to enclosure air and the rear portion and side 4 are exposed to outdoor air. The case is usually mounted so that most of the case extends outwardly of the wall and, for reasons hereinafter to be explained, this is considered the most preferable arrangement for a case housing a thermoelectric air conditioning unit.

Means are provided within the interior of the case for dividing the case into first and second groups of substantially parallel cross-flow air flow passages. More specifically, referring to FIGURE 2 these means include a plurality of thermopile units designated by the reference numerals 8 and 8*a* which are enclosed within the case by an insulation material 9 that electrically and thermally insulates the thermopiles from the case. In the illustrated embodiment, the insulation material 9 is a foam plastic which is commonly used for manufacturing modular units of thermoelectric materials. The thermoelectric units 8 and 8a are arranged parallel to each other and cooperate with the foam material 9 to provide a first group of vertical air flow passages, respectively designated 11, and a second group of horizontal air flow passages, designated by the reference numeral 12. The separate groups of air flow passages are arranged in cross-flow relationship by enclosing the upper and lower ends of the second group 12 and enclosing the opposite vertical ends of the first group 11.

The term "cross-flow air passages" as set forth in this specification and in the claim annexed hereto is meant to describe passages arranged with their inlets and outlets so disposed that air flow through one group of passages flows crosswise or at approximately 90° from the direction of the air flow in the other group of passages. That is, as may be seen in FIGURE 1, if air flows through one passage in the horizontal direction, it flows through the adjacent passages on opposite sides of the one passage in substantially the vertical direction or crosswise with respect to the direction of air flow in the one passage. As may be seen in FIGURE 1, the passages 11 of the first group are arranged alternately with respect to the passages 12 of the second group.

As may be seen in FIGURE 2, the spaced apart thermopiles comprise an array of thermoelectric junctions of series connected materials having dissimilar thermoelectric properties. The thermoelectric materials are indicated by blocks designated by either N or P. The N and P nomenclature is prevalent in semi-conductor terminology at present and is used herein for convenience in differentiating materials having dissimilar thermoelectric properties. An N material includes an abundance of electrons. A P material includes an abundance of electron vacancies or holes. A thermocouple is formed by an N type material which is joined to a P type material through suitable links 13 and 13a of thermally and electrically conductive material, such as copper. When a direct current is passed through such a thermocouple in the positive direction, i.e., from N to P, the junction between the N and P materials becomes cold. That is, the link 13 (or 13a), which is connected between the N and P materials, becomes cold when the direction of current flowing through the thermopile is in the direction of the N to P materials. Conversely, when a direct current is passed through the junction in the opposite direction, i.e. from P to N, the junction or conductive links connecting the respective materials then become hot.

As may be seen in FIGURE 2, the conductive links 13 and 13a, forming alternate junctions between the thermoelectric materials, are disposed respectively adjacent opposite sides of the thermopile members. That is, all of the conductive links 13 are adjacent one side of the thermopile and all of the conductive links 13a are adjacent the other side of the thermopile. Thus, all of the junctions or links on one side of a thermopile heat the air flowing through the pasage adjacent thereto while all of the junctions or links on the opposite side of the thermopile cool air flowing through the passages thereto.

In the preferred embodiment of the invention, the links 13 and 13a are electrically insulated from the first and second groups of passages by some material 10 providing good electrical insulation but not providing a substantial barrier to transfer heat to the passages. Any of the well-known types of insulating materials having these characteristics, such as a sheet of mica or plastic-type insulation coating, can be used for this purpose. Also arranged within the space or passages between the sides of adjacent thermopiles are a plurality of fins or heat exchange members 16 which are adapted to facilitate the exchange of heat between the sides of the thermopiles and the air flowing through the respective passages.

As will be seen in FIGURE 2 all of the conductor links 13 are disposed adjacent the passages 11 forming the first group and all of the conductor links 13a are adjacent the passages 12 forming the second group. Thus all of the links 13a are arranged to absorb heat from or dissipate heat into the second group of passages while the links 13 are arranged respectively to dissipate into or absorb heat from the first group of passages.

A plurality of narrow longitudinal openings 17 in the top 5 of the case align with the upper end of the first group of air flow passages 11 and a plurality of narrow longitudinal openings 18 in the bottom 6 of the case align with the bottom ends of the vertical air passages 11 of the first group. Openings 17 and 18 are so arranged in the case that they extend to the outdoor side thereof and permit outdoor air to flow directly through the first group of passages from one end to the other. Thus, it will be seen that outdoor air is constantly introduced into the first group of passages 11 and flows directly therethrough to either heat or cool the sides of the thermopiles exposed to these respective passages.

Means are provided within the case for circulating air from the enclosure into the case and through the second group of air flow passages 12. More specifically, these means include an air inlet opening 19 and discharge or outlet opening 20 formed in the front portion 3 of the case which is exposed to enclosure air. These means also include a fan 21 mounted in the front portion of the case within an indoor compartment 15 formed ahead or on the indoor side of the thermopile units. In the illustrated embodiment, the fan 21 is mounted adjacent the discharge opening 20 and air is drawn through the case and horizontal air flow passages 12 of the second group by the fan. More specifically, enclosure air enters the inlet opening 19 where it flows into the forward end of certain of the air flow passages 12. In the illustrated embodiment, these air flow passages are the two left hand passages as seen in FIGURE 1. Enclosure air is heated or cooled as it flows through these passages and then enters a plenum chamber 22 formed in the remote end of the outdoor portion of the case. The plenum chamber 22 communicates with the remote ends of all of the horizontal air flow passages 12 of the second group. Air, entering the chamber 22 from certain of the passages 12, or the left hand passages as seen in FIGURE 1, of the first group, is then diverted into the remaining air flow passages of the first group to be further heated or cooled as it flows through these passages. Thus enclosure air flows through the case in a U-shaped circuit and passes through certain of the passages 12 on the left hand side of the case (as seen in FIGURE 1) and then passes through the remaining air flow passages of group 12 on the right hand side of the case before being discharged from the case through the discharge opening 20. Thus all of the enclosure air is exposed to two separate passages 12 of the first group as it makes its circuit through the case 2. In the front or indoor compartment 15 there is provided a divider wall 23 which separates the inlet and discharge sides of the compartment and prevents recirculation of air before it is discharged through the opening 20. Also arranged in the front section of the case 2 is a control box 24 which contains the necessary power converting apparatus for converting the household A.C. power supply to D.C. power which is, of course, required for operation of the thermoelectric heating and cooling units or thermopiles. Convertors of this type are well known in the art and a description thereof is not deemed necessary for a full understanding of the present invention except insofar as to say that it may or may not be required depending on the type of power available for the unit. That is, the power may be supplied to the unit through some source of D.C. supply and the power pack itself or the converting means itself may then be eliminated from the unit. The control box may also include a thermostat or temperature sensing device which permits adjustment or control of the temperature of the air within the enclosure. This device senses the temperature of the incoming air and conditions the unit to heat or cool depending upon the particular operating function called for on the thermostat. Adjustment of the thermostat and the controls of the control box 24 may be accomplished through suitable knobs **24*a* protruding through the front side 3** of the case.

As may be seen upon reference to FIGURE 1, the outdoor air flow circuit presents less restriction to air flow than the indoor air flow circuit. All of the outdoor air flow passages are arranged in parallel relationship, while the indoor air flow passages are arranged in a series-parallel arrangement to form the previously described U-circuit. This favorable arrangement of the air flow through the first or outdoor passages and the second or indoor passages of the unit has been embodied to provide compatibility with the air flow requirements of a heat pumping device. When operating as a cooling device, the indoor heat exchanger must absorb heat from the enclosure, while the outdoor heat exchanger must not only dissipate the heat absorbed by the cold junctions but must also dissipate an amount of heat equivalent to the electrical input of the heat pump. Thus during cooling the requirements of the outside heat exchanger are greater than those of the enclosure side heat exchanger. The relatively low air pressure drop system on the outdoor side allows for a relatively higher air flow and promotes higher heat exchanger performance.

On the other hand when the unit is operated to heat the enclosure, it is still desirable to have a relatively low indoor flow and a relatively high outdoor flow. The low indoor flow is desired to insure an adequate temperature rise in the air so that comfort is attained and the relatively high outdoor flow is desired to minimize the effects of frost formation.

In the preferred embodiment of the invention, as shown in the drawings, the outdoor air is passed through the vertical or first group of passages 11 by convection currents due to the heat dissipation or heat absorption within the passages. In the embodiment shown, air is flowing in the upward direction, as indicated by the arrows in FIGURE 1, and is absorbing heat within the passages 11. The unit is, of course, being operated as a cooling unit with the second group of passages absorbing heat from the enclosure air. When the unit is operated for heating purposes, the passages 11 absorb heat from and therefore cool the outdoor air. The air flow through passages 11 during the heating cycle is in the reverse direction than shown in FIGURE 1 or, more specifically flows downwardly through the passages. If desirable, a blower fan may be added to the unit to increase the air flow through the first group of passages. This may be done by adding a fan section or compartment to the top or bottom of the case in the outdoor portion thereof.

While in accordance with the patent statutes there has been described what at present is considered to be the preferred embodiment of the invention, it will be understood by those skilled in the art that various changes and modifications may be made therein without departing from the invention, and it is, therefore, the aim of the appended claim to cover all such changes and modifications as fall within the true spirit and scope of the invention.

What I claim as new and desire to secure by Letters Patent of the United States is:

A self-contained air conditioning apparatus utilizing the Peltier effect for heating or cooling air from an enclosure comprising a substantially rectangular case adapted for mounting in an outer wall of an enclosure with a front side thereof exposed to said enclosure and an outer portion thereof exposed to outdoor air, means dividing said case into first and second groups of substantially parallel cross-flow air flow passages, said air flow passages of said first group arranged alternately with said air flow passages of said second group, said air flow passages of said first group having openings in the top and bottom thereof so that air may flow therethrough in the vertical direction, said air flow passages of said second group having inner ends adjacent the front portion of said case and remote ends in said outdoor portion of said case so that air flows therethrough in the horizontal direction, said means dividing said case into said air flow passages including a plurality of thermopile units each having one side thereof adapted to absorb heat from an air flow passage of one of said groups and an opposite side thereof adapted to dissipate heat into an air flow passage of said other group when an electrical current is passed through said thermopile units, openings in the top and bottom sides of said outer portion of said case, said openings communicating with said openings in said air flow passages of said first group so that outdoor air may pass through said first group of air flow passages in heat exchange relationship with said sides of said thermopile units adjacent thereto, inlet and outlet openings in said front portion of said case for circulating a stream of enclosure air in a horizontal direction through said second group of air flow passages, said inlet opening communicating with certain of said inner ends of said air flow passages of said second group and said outlet opening communicating with certain of said inner ends of said air flow passages of said second group, fan means in said front portion of said case adapted to circulate a stream of air from within said enclosure through said second group of air flow passages, and a plenum chamber in said outer portion of said case communicating with the remote ends of all of said air flow passages of said second group for reversing the flow of enclosure air flowing from certain of said air flow passages of said second group into the remainder of said air flow passages of said second group.

References Cited in the file of this patent

UNITED STATES PATENTS

| | | |
|---|---|---|
| 2,425,417 | Booth | Aug. 12, 1947 |
| 2,937,218 | Sampietro | May 17, 1960 |
| 3,024,616 | Bury | Mar. 13, 1962 |